United States Patent [19]
Want et al.

[11] Patent Number: 5,721,725
[45] Date of Patent: Feb. 24, 1998

[54] PROTOCOL FOR CHANNEL ACCESS IN WIRELESS OR NETWORK DATA COMMUNICATION

[75] Inventors: Roy Want, Mountainview, Calif.; William N. Schilit, New York, N.Y.; Richard J. Goldstein, San Francisco; Norman I. Adams, Sunnyvale, both of Calif.

[73] Assignee: Xerox Corporation, Stamford, Conn.

[21] Appl. No.: 550,315

[22] Filed: Oct. 30, 1995

[51] Int. Cl.⁶ .................................................. H04J 3/16
[52] U.S. Cl. ........................ 370/236; 370/468; 370/476
[58] Field of Search ........................... 370/445, 447, 370/446, 448, 230, 276, 277, 278, 279, 280, 315, 338, 400, 401, 402, 403, 404, 410, 449, 450, 451, 452, 453, 454, 455, 456, 457, 458, 459, 461, 465, 468, 470, 473, 474, 476, 231, 522, 433, 432, 437, 501, 502, 229, 232, 233, 234, 235, 236, 237, 238, 252, 253

[56] References Cited

U.S. PATENT DOCUMENTS

| | | | |
|---|---|---|---|
| 5,123,029 | 6/1992 | Bantz et al. | 375/1 |
| 5,231,634 | 7/1993 | Giles et al. | 370/95.1 |
| 5,319,641 | 6/1994 | Fridrich et al. | 370/85.3 |
| 5,329,531 | 7/1994 | Diepstraten et al. | 370/94.2 |
| 5,335,226 | 8/1994 | Williams | 370/85.2 |
| 5,361,063 | 11/1994 | Jaffe et al. | 340/825.5 |
| 5,369,639 | 11/1994 | Kamerman et al. | 370/85.3 |
| 5,530,695 | 6/1996 | Dighe | 370/395 |

OTHER PUBLICATIONS

Karn, "MACA, A New Channel Access Method for Packet Radio", Sep. 1990, pp. 134–141.

*Primary Examiner*—Wellington Chin
*Assistant Examiner*—Huy D. Vu
*Attorney, Agent, or Firm*—R. Hutter

[57] ABSTRACT

In a carrier sense multiple-access (CSMA) network, such as a wireless network or a LAN, a transceiver which initiates a transmission to a recipient transceiver in the same medium sends out, prefatory to a bulk of data, a field representative of the length of the data, and another field symbolic of the rate at which the data is to be sent. Non-participant transceivers in the medium receive the data length field and the data rate field, and calculate a length of time they must inhibit themselves to avoid a data collision with the transmitting transceiver, while the participants come to a common agreement at which they can send and receive data.

4 Claims, 3 Drawing Sheets

PROTOCOL FOR CHANNEL ACCESS IN WIRELESS OR NETWORK DATA COMMUNICATION

FIELD OF THE INVENTION

The present invention relates to local area networks, or LANs, wherein a plurality of stations communicate with one another over a medium for the transmission of digital data. The present invention can be directed to wireless systems, wired systems, or systems having wired and wireless aspects.

BACKGROUND OF THE INVENTION

Various methods are known for sharing network communication channels, or links, among stations in a local area network. One widely used method is known as carrier sense multiple access, or CSMA. With the general CSMA method there is known two general categories, CSMA/CD (collision detect) and CSMA/CA (collision avoidance). Under the "collision detect" method, a station wishing to transmit a message over a medium to a selected one other station among many possible stations listens until the transmission channel is idle before beginning to transmit an information field, by which a communication to another station is initiated. The sending station continues to listen to the channel after commencing a transmission, and if a collision is detected, that is, more than one station has begun to transmit an information field, any station which detects such a collision terminates its message transmission and transmits a jam pattern, or garble, such that all other stations on the network or available in the medium are informed of the collision. When other stations in the medium are informed of the data collision, the stations terminate their own message transmissions, and wait a random time before attempting to commence a further message transmission. In this way, multiple stations on a network or available to each other through a medium (such as through the air) can organize themselves so that messages are directed from one station to another as desired. The CSMA/CD protocol is the subject of an international ISO standard and corresponding IEEE standard 802.3, and has become a generally used protocol for LANs utilizing wired connections for transmission between stations.

Another category of CSMA networks is the CSMA/CA, or collision avoidance system. The CSMA/CA system is preferred for wireless systems, because wireless systems cannot sense the medium (such as the air) while they are transmitting, because the power of the local transmitter tends to mask out signals from remote transmitters, making any collisions undetectable. A CSMA/CA system attempts to minimize the possible collision time, by providing a protocol by which an exchange of a small (such as 3 byte) data field is made between the transmitter and the desired receiver immediately before the bulk of the data desired to be sent is transmitted. The transmitting station sends out a request to send (RTS) field, and in response, the desired receiver in the medium replies with a clear to send (CTS) data field. If the transmitting station receives the CTS field, the transmitting station will know that the medium is clear and the transmitter can immediately continue with sending its data field. If the CTS field is not returned from the desired receiving station, the transmitting station determines that a collision must have occurred with other data being transmitted through the medium at a particular moment. When collisions occur, a "backoff and retry" mechanism, by which the transmitting station essentially waits for a randomly-determined amount of time before trying to send the message again, is implemented.

In realizing wireless systems, an important practical challenge is known as the "hidden terminal problem," illustrated in FIG. 3. In brief, if there is a wireless system having three transceivers A, B, and C, each transceiver having a finite signal range, it is possible that one particular transceiver may not be able to communicate with all of the other transceivers in the medium. In FIG. 3, transceivers A, B, and C are spaced over a geographical area. The effective ranges of transceiver A and transceiver C are shown by the respective circles around the letters. Transceiver B has an effective range as well, but it is not shown in FIG. 3. When the transceivers A, B, and C are disposed at a certain spacing in a geographical area as shown in FIG. 3 relative to their respective ranges, it is apparent that transceiver A can detect transceiver B and transceiver B can detect transceiver C, but transceiver C is not able to detect transceiver A. Thus, if transceiver A transmits to transceiver B using CSMA/CA, C will not be able to detect the RTS (request to send) field from transceiver A, but will receive only the resulting CTS (clear to send) field sent by B in response to A. In this case, C will not know when the medium is clear for C to transmit because the RTS field as well as the transmitted data from transceiver A can not be detected by C: A is a hidden terminal relative to C. Because, in many situations with wireless transceivers, not every transceiver can be aware of every other transceiver in the medium, this "hidden terminal" problem is fairly common.

DESCRIPTION OF THE PRIOR ART

In the prior art, U.S. Pat. No. 5,123,029 discloses a radio communications system wherein links between mobile transceivers is performed with a combination of controlled access and random access schemes.

U.S. Pat. No. 5,231,634 discloses sending a signal between two transceivers in which the request-to-send message includes reservation duration information. During the reservation period, one transceiver transmits information to a second transceiver, while other transceivers are instructed to remain silent.

U.S. Pat. No. 5,319,641 discloses a collision avoidance system in which an apparatus calculates a time period after detecting that the medium is idle. The time period is a function of a pseudo-random delay factor. If the medium remains idle during the calculated time period, the apparatus is allowed to transmit a message.

U.S. Pat. No. 5,329,531 discloses a method by which isochronous and asynchronous messages may share the same medium. A base station generates regular timing periods in which isochronous traffic is sent to stations with a higher priority than asynchronous traffic.

U.S. Pat. No. 5,335,226 discloses a communications system in which each node includes a primary and secondary collision detection circuit, and a unique value that is included in each transmission. The unique values of the nodes are designed so that collisions not detected by the primary collision detection circuit are detected by the secondary collision detection circuit.

U.S. Pat. No. 5,361,063 discloses a scheduling mechanism wherein a node includes an arbitration circuit. Once a node has a message ready for transmission, the arbitration circuit delays access to the medium if total transmission activity on the medium exceeds a threshold value.

U.S. Pat. No. 5,369,639 discloses a system which simulates a collision avoidance system using collision detection chips, by the use of simulating collisions in the medium to induce a back-off mode in the collision detection chip.

In the paper by Karn, entitled "MACA—A New Channel Access Method for Field Radio" (Proceedings of the Ninth Computer Networking Conference, ARRL/CRRL Amateur Radio, September 1990, pp. 134–141), there is proposed a protocol intended to overcome the "hidden terminal problem" found in wireless systems. The Karn system is similar to the CSMA/CA system, by which communication between two transceivers is initiated by a RTS field from the initiator transceiver and responded to by a CTS field from the desired recipient. However, under the Karn system, there is also provided, along with the original RTS field, another field symbolic of the amount of data the initiator transceiver plans to send to the receiving transceiver. The original RTS signal, along with the "data-length" field, is received by every available transceiver within range of the initiator transceiver. In response to the initial RTS field and the data-length field, all of the transceivers within range of the initiator transceiver inhibit themselves (that is, they avoid sending out any signals themselves) for a sufficient length of time until the data field from the initiator is sent out and presumably received by the desired recipient transceiver. Also, when the recipient receives the data-length field, the data-length field is repeated in the CTS packet. By looking at the data-length field, all of the other non-involved transceivers will know how long to "be quiet" for the desired transmission from the initiator transceiver, before the medium is free again. If the information from the initiator transceiver is small in amount, the necessary inhibition time for the other transceivers will be relatively short; if the data-length field specifies a relatively long message, the inhibition time of the other transceivers will be relatively long.

The present invention proposes a further improvement to the "MACA protocol" described in the Karn paper.

SUMMARY OF THE INVENTION

According to the present invention, there is provided a system and method of operating transceivers on a network in which a plurality of transceivers are operable to exchange data over a medium. A first transceiver sends a data-length field over the medium, the data-length field being symbolic of an amount of data in a transmission desired to be sent by the first transceiver. The first transceiver also sends a data-rate field over the medium, the data-rate field being symbolic of a transmission rate of data in a transmission desired to be sent by the first transceiver.

According to another aspect of the present invention, there is provided a transceiver operable to exchange data over a medium. The transceiver is adapted to receive a "request to send" signal over the medium, a data-length field over the medium, symbolic of an amount of data in a transmission desired to be sent by a sending transceiver, and a data-rate field over the medium, being symbolic of a transmission rate of data in a transmission desired to be sent by the sending transceiver. The transceiver determines a transmission time for the transmission desired to be sent by the sending transceiver, based on information derived from the data-length field and the data-rate field. The transceiver avoids sending any signals for a predetermined period based on the determined transmission time.

BRIEF DESCRIPTION OF THE DRAWINGS

According to another aspect of the present invention, there is provided a transceiver operable to exchange data over a medium. Means are provided for receiving a "request to send" signal; a data-length field, symbolic of an amount of data in a transmission desired to be sent by a sending transceiver; and a data-rate field, symbolic of a transmission rate of data in a transmission desired to be sent by the sending transceiver. The transceiver repeats the data-length field to another transceiver within a predetermined range.

In the drawings.

DETAILED DESCRIPTION OF THE INVENTION

Figure 1:
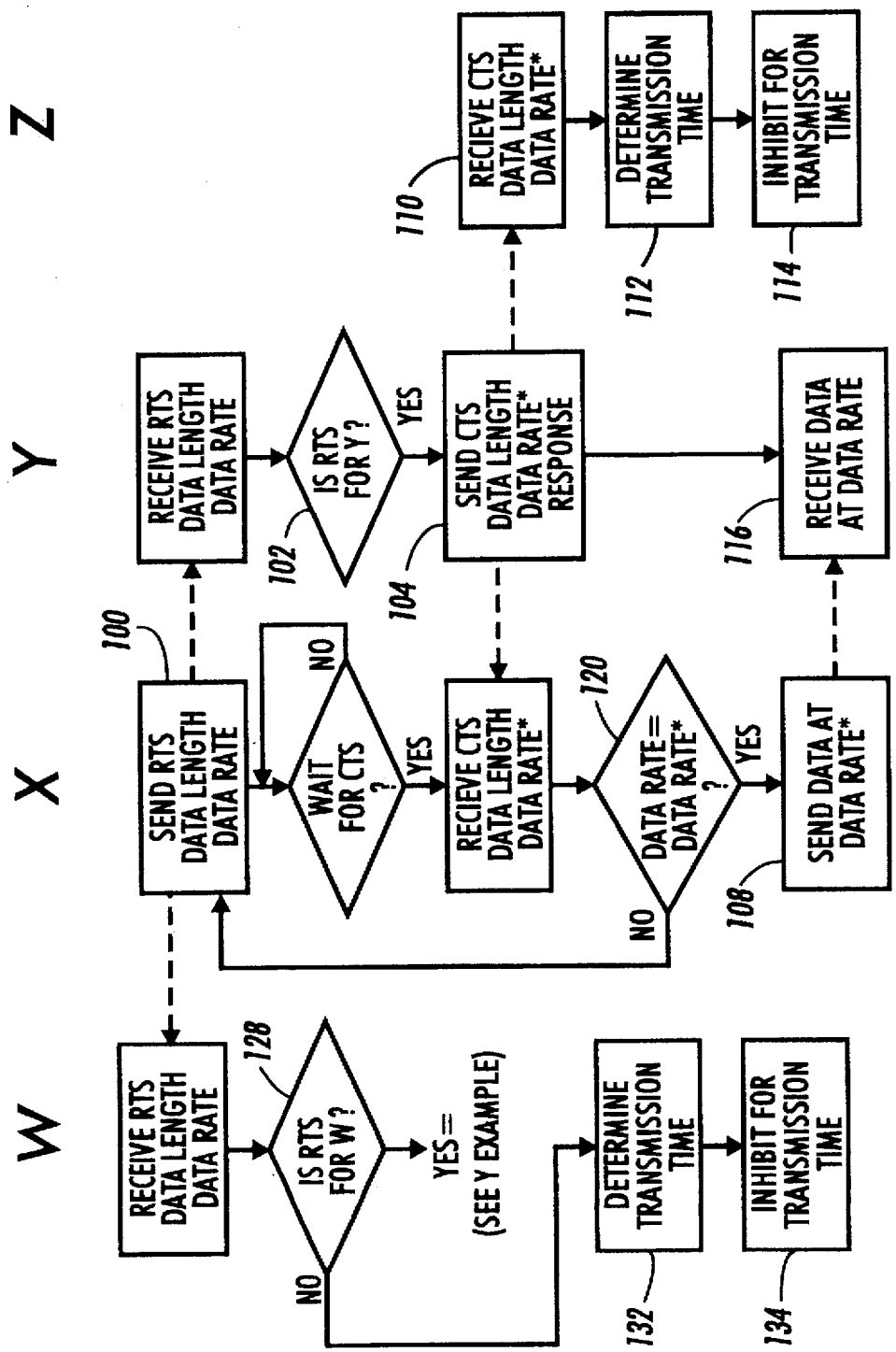
FIG. 1 is a set of parallel flow-charts showing the operation of an initiator transceiver, a recipient transceiver, and a non-recipient transceiver, in carrying out one method of the present invention.

FIG. 1 is a set of parallel flow-charts demonstrating the behavior of three separate transceivers W, X, Y, Z, in carrying out the method of the present invention. In the example shown in FIG. 1, it is desired that sending transceiver X hail and send data to a recipient transceiver Y sharing the same network or medium. Transceivers W and Z are non-participant transceivers in the transaction between transceivers X and Y. However, in the diagram of FIG. 1, only adjacent letter transceivers are within communication range of each other. Transceiver W is on the same network or medium as transceiver X, but may be out of range of recipient transceiver Y. Transceiver Z is also on the same network or medium as transceiver Y, although transceiver Z need not be in the same medium (such as geographical range) as transceiver X. In other words, transceiver W is a hidden terminal with respect to transceiver Y and transceiver Z, and transceiver Z is a hidden terminal with respect to transceiver W and transceiver X. The parallel flow-charts for each transceiver are intended to be roughly contemporaneous going down the flow-chart.

When transceiver X desires to send a signal of a certain data length and data rate to transceiver Y, the process is initiated by transceiver X sending out a request-to-send (RTS) signal to transceiver Y, as shown in FIG. 1 at block 100. Assuming of course that transceiver Y is within range of transceiver X, transceiver Y will receive the RTS signal, and first determine whether the signal received from transceiver X is intended for transceiver Y, as shown at block 102.

According to a preferred embodiment of the present invention, there is sent out, with the original RTS from transceiver X, two data fields, one data field including data symbolic of the total length of the desired data to be sent, and another field including data symbolic of the intended rate at which X intends to transmit the data. As used in the claims herein, the word "field" can apply to fields, packets, or any other means by which such data is conveyed from one transceiver to another.

Once transceiver Y recognizes that the RTS is intended for itself, transceiver Y sends out a clear-to-send (CTS) signal to be received by transceiver X, as shown at block 104, assuming of course that, at the particular moment, transceiver Y is indeed available for accepting data from transceiver X. On occasions when transceiver Y is not available to receive data, no CTS signal will be sent, and transceiver X can try again, such as through retry techniques known in the art.

According to the preferred embodiment of the present invention, when transceiver Y sends out its CTS signal, transceiver Y repeats the data length field it has received from transceiver X in the original RTS signal, as shown at block 104. Transceiver Y also sends back a response data rate field which is either the same data rate field it has received from transceiver X, or else a data rate field symbolic of the maximum data rate transceiver Y can handle, for reasons which will be described in detail below. Even though such information may be redundant to transceiver X, the data length and data rate field can be received by any transceiver, such as Z, within range of transceiver Y, which is especially important if transceiver Z is a "hidden terminal" with regard to transceiver X. By repeating the data length it has received from transceiver X and sending out a data rate field, transceiver Y effectively instructs all transceivers within its own range (as opposed to within the range of transceiver X) not to interfere with the impending transmission of data from transceiver X to transceiver Y.

Once transceiver X receives the CTS signal from transceiver Y, transceiver X begins sending the relevant data at the data rate, as shown at block 108. This data is received by transceiver Y at the data rate, as shown at block 116. If it happens that transceiver Y is incapable of receiving the data at the data rate mentioned in the original data rate field sent with the RTS in block 100, it is conceivable to provide means within transceiver Y to communicate to transceiver X that another data rate must be used, such as a default data rate. One possible technique for reconciling different maximum data rates among transceivers such as X and Y is to have transceiver Y, as part of returning the CTS signal such as at block 104, send back to transceiver X not a mere repetition of the data rate field originally sent by transceiver X in the RTS signal, but rather a signal representative of the maximum data rate transceiver Y can handle, such as indicated as "data rate*."

When non-participant transceiver Z receives a CTS signal which is not relevant to itself, such as a signal from transceiver Y to transceiver X, transceiver Z can be programmed to accept, within a particular range of time, the fields for data length and data rate, as shown at block 110. For transceiver Z, both the data length field and the data rate field from transceiver X are relevant even if the transceiver is not intended to receive the actual data from transceiver X intended for transceiver Y. Non-recipient transceiver Z uses the data length field and the data rate field originating from transceiver Y to calculate a total transmission time by which transceiver X will send its intended data to transceiver Y. In order to prevent collisions between the different transceivers in the medium, it is required that, when a particular transceiver in the medium is sending out data, all other available transceivers in the medium be temporarily inhibited from sending out signals until the transmission is over, so as to avoid collisions between multiple signal sources in the medium.

Transceiver Z takes the data length field and data rate field sent out by transceiver Y, as shown at block 110, and calculates the total transmission time (essentially, data length times the data rate) of the transmission of the desired data from transceiver X to transceiver Y, as shown at 112. During this calculated transmission time, transceiver Z is inhibited from sending out any signals itself, as shown at 114. In this way, a collision between signals from transceiver X and signals from transceiver Z is avoided.

In most practical embodiments of the invention, transceiver Y is also programmed not to transmit any signals itself during the time it is receiving signals from transceiver X. Transceiver Y can calculate the duration of transmission from transceiver X from the data length field and the data rate field it sent to transceiver X with the CTS signal, in the same manner as transceiver Z.

Recipient transceiver Y makes use of the data rate field sent from transceiver X and, if it is capable, adjusts its circuitry to receive the transmission from transceiver X at the rate at which it is sent from transceiver X, as shown at 116. Typically, according to a high-efficiency system, the small RTS and CTS field sent between transceiver X and transceiver Y can always be transmitted at a known standard low speed, something all mobile radio equipment has in common. Once the "handshake" between X and Y is completed, however, transceiver X can signal to transceiver Y through the data rate field that the subsequent data can be transmitted at the more optimal higher speed. Because transceiver Y has been explicitly informed, by the data rate field, about the transmission speed of the oncoming data, large-scale data transmissions can always be performed at the highest rate at which the sender and the recipient transceiver are capable. It should also be noted that non-participant transceivers, such as Z, can calculate the time of transmission between transceivers X and Y, even if transceiver Z is not itself capable of receiving data at a high rate.

In situations where a sending transceiver such as X and recipient transceiver Y are originally of incompatible data rates, there may be a "hidden terminal" problem with regard to transceiver X. In the basic case described with reference to FIG. 1, where transceiver Z is a hidden terminal relative to transceiver X, the fact that transceiver Y sends out a response data rate serves to inhibit hidden transceiver Z until the data has been successfully sent from transceiver X to transceiver Y. If, however, there is a hidden terminal, such as transceiver W, within the range of sending transceiver X but not within range of the CTS and response data rate sent by transceiver Y, it may be desirable or necessary that this other hidden terminal be inhibited as well.

There are, according to preferred embodiments of the present invention, two possible techniques for effectively inhibiting transceivers such as transceiver W, which are out of range of the response data rate field sent out by transceiver Y. The first technique, shown at block 120 in FIG. 1, involves having transceiver X effectively reconfirm the response data rate demanded by transceiver Y. Since transceiver Y will demand a data rate equal to or slower than that originally proposed by transceiver X, sending transceiver X must always conform to the demands of transceiver Y. The response data rate demanded by transceiver Y is shown in FIG. 1 as "data rate*." In the case where transceiver Y demands a data rate slower than originally proposed, as shown at block 120 in FIG. 1, transceiver X determines whether the response data rate is equal to the originally proposed data rate, as shown at block 120. If the response data rate equals the proposed data rate, then data will be sent at that data rate, in the manner mentioned above. If, however, the response data rate provided by transceiver Y is different from that originally proposed by transceiver X, transceiver X will select a new, revised data rate equal to the response data rate and then re-initiate the entire transaction, as shown by leading to initial block 100. Under this technique, transceiver X effectively renegotiates the data rate by re-initiating a request to send (RTS) signal, this time proposing a new, lower data rate.

Under this technique illustrated in FIG. 1, a hidden terminal such as transceiver W, which is within range of transceiver X but not transceiver Y, can be made to inhibit itself just as is a hidden terminal within range of recipient transceiver Y but out of range of transceiver X, such as transceiver Z. Transceiver W, recognizing that it is not a participant in the transmission from transceiver X to transceiver Y (such as at block 128), calculates this transmission time from the data length and data rate, as shown at block 132, and then inhibits itself for the calculated amount of time for transceiver X to send out its data, as shown at block 134. Thus, all relevant terminals within range of either sending transceiver X or recipient transceiver Y are inhibited for a specially-determined amount of time for avoiding collisions.

Figure 2:
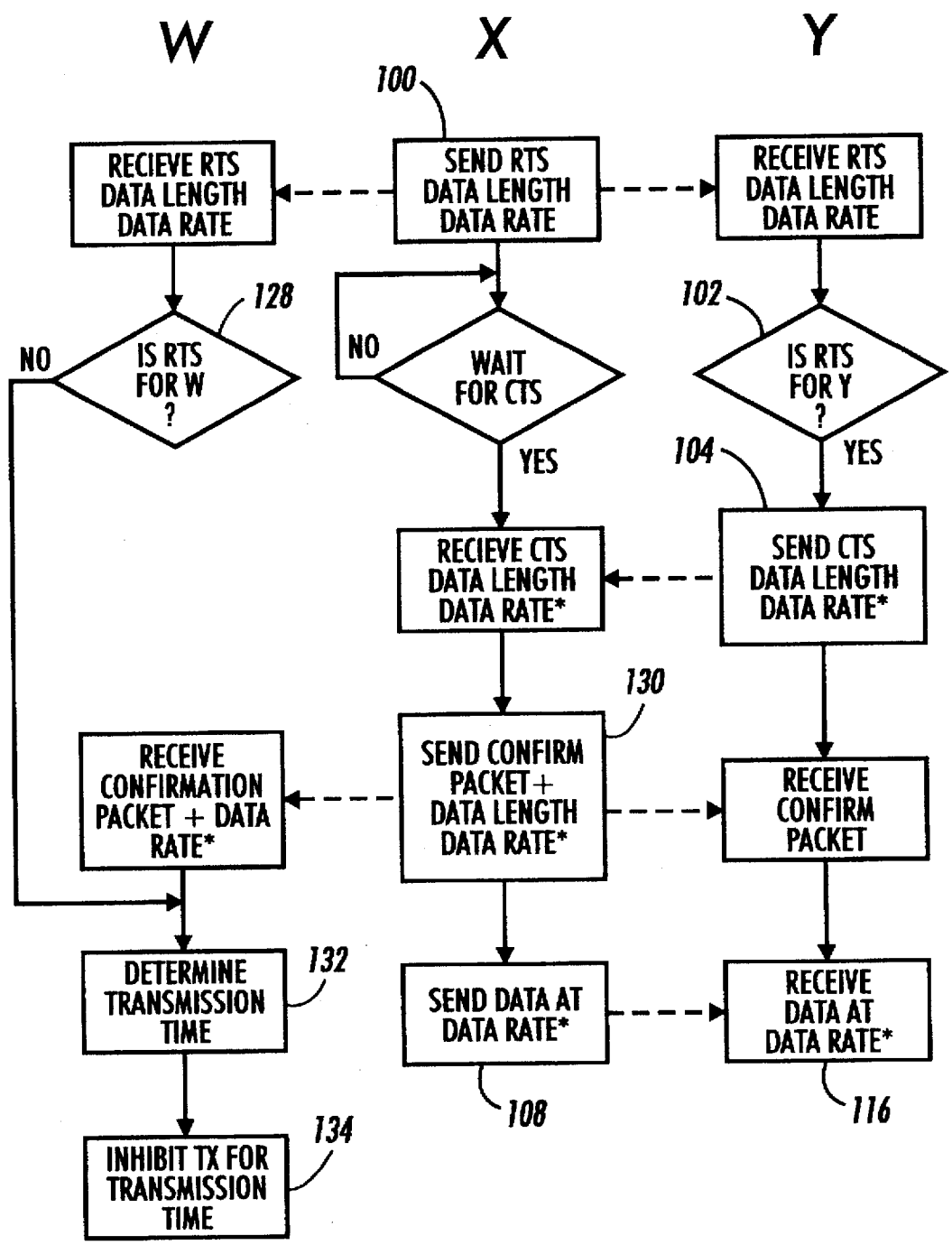
FIG. 2 is a set of parallel flow-charts showing the operation of an initiator transceiver, a recipient transceiver, and a non-recipient transceiver, in carrying out a variant method of the present invention.
Figure 3:
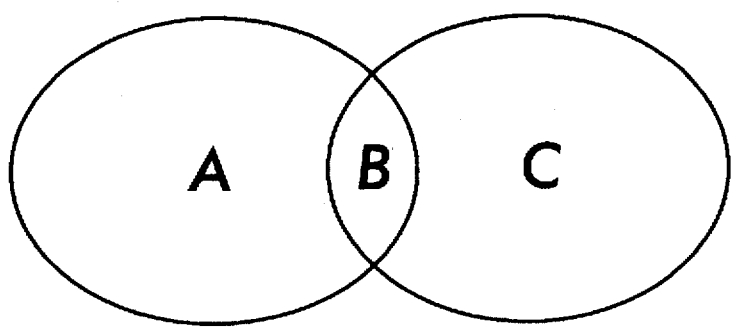
FIG. 3 is a simple illustration showing an arrangement of transceivers over a geographical area, illustrating the "hidden terminal problem."

Another technique for avoiding collisions with hidden terminals relative to sending transceiver X is shown in FIG. 2. (In FIGS. 1 and 2, like flowchart steps are identical in both techniques.) Under this technique, prefatory to transceiver X sending out the data at the response data rate, transceiver X sends out a "rate confirmation packet" which confirms that the transceiver X has adapted to the response data rate ("data rate*") demanded by transceiver Y, as shown in FIG. 2 at block 130. This confirmation packet is the functional equivalent of the CTS with data length and response data rate sent out by recipient transceiver Y in block 104, for receipt by transceiver Z in FIG. 1. However, this confirmation packet, being sent out by sending transceiver X, is intended to be received by all terminals within range of sending transceiver X, such as hereshown as W, which may not be within range of the CTS sent out by transceiver Y. Once again, as in in FIG. 1, transceiver W calculates, from the data length and data rate, the transmission time for transceiver X to send out its data, as shown at block 132, and then inhibits itself for the calculated amount of time, as shown at block 134. Thus, transceiver W inhibits itself in response to the confirmation packet sent by transceiver X in exactly the same manner that transceiver Z responds to the CTS with data length and response data rate fields sent by transceiver Y in FIG. 1. In this way, all terminals which are in range of a sending transceiver and a recipient transceiver, but not part of the transaction of data desired to be sent, are caused to inhibit themselves in order to avoid collisions.

Under one variation of this technique, transceiver X can send out the rate confirmation packet only if there is a change in data rate requested by transceiver Y. If transceiver Y accepts the data proposed in the original RTS, then sending a confirmation packet may not be strictly necessary for ensuring that transceiver W is inhibited for a sufficient length of time.

A practical advantage of the the "rate confirmation packet" technique of FIG. 2 over the "renegotiation" technique of FIG. 1 is that the rate confirmation technique consumes less additional bandwidth. Sending the confirmation packet removes the need for sending another CTS packet.

The present invention can be distinguished from the disclosure in U.S. Pat. No. 5,231,634, in that the system of the '634 patent includes a request to reserve a certain period of "quiet time" on the medium accompanying an RTS message. While the system of the '634 patent is a solution to the "hidden terminal problem," there is no provision that, once a link between an initiator and recipient transceiver is established, the two transceivers can switch to a data rate different from that of the original RTS signal. Thus, the system of the present invention is both more flexible and, given transceivers capable of special high data rates, more efficient than that described in the '634 patent.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method of operating transceivers where a plurality of transceivers are operable to exchange data over a medium, comprising the steps of:

a first transceiver sending a data-length field over the medium, the data-length field being symbolic of an amount of data in a transmission desired to be sent by the first transceiver;

the first transceiver sending a data-rate field over the medium, the data-rate field being symbolic of a transmission rate of data in a transmission desired to be sent by the first transceiver;

a second transceiver sending a response data-rate field to the first transceiver, the response data-rate field being symbolic of a transmission rate of data in a transmission desired to be received by the second transceiver;

the first transceiver sending data to the second transceiver at a data rate symbolized in the response data-rate field;

the first transceiver comparing the data-rate field to the response data rate field; and when the response data-rate field is not equal to the data-rate field, the first transceiver sending over the medium a "request to send" signal and a revised data-rate field, the revised data-rate field being symbolic of a data rate equal to the data rate symbolized by the response data-rate field.

2. A method of operating transceivers where a plurality of transceivers are operable to exchange data over a medium, comprising the steps of:

a first transceiver sending a data-length field over the medium, the data-length field being symbolic of an amount of data in a transmission desired to be sent by the first transceiver;

the first transceiver sending a data-rate field over the medium, the data-rate field being symbolic of a transmission rate of data in a transmission desired to be sent by the first transceiver;

a second transceiver sending a response data-rate field to the first transceiver, the response data-rate field being symbolic of a transmission rate of data in a transmission desired to be received by the second transceiver;

the first transceiver sending data to the second transceiver at a data rate symbolized in the response data-rate field; and the first transceiver sending over the medium a rate confirmation packet, the rate confirmation packet including a revised data-rate field, the revised data-rate field being symbolic of a data rate equal to the data rate symbolized by the response data-rate field.

3. A transceiver operable to exchange data over a medium, comprising:

means for sending a data-length field over the medium, the data-length field being symbolic of an amount of data in a transmission desired to be sent by the first transceiver;

means for sending a data-rate field over the medium; the data-rate field being symbolic of a transmission rate of data in a transmission desired to be sent by the transceiver;

means for receiving a response data-rate field over the medium; the response data-rate field being symbolic of a transmission rate of data in a transmission desired to be received by a second transceiver;

means for sending data to the second transceiver at a data rate symbolized in the response data-rate field;

means for comparing the data-rate field to the response data-rate field; and means for sending over the medium a "request to send" signal and a revised data-rate field, the revised data-rate field being symbolic of a data rate equal to the data rate symbolized by the response data-rate field, when the response data-rate field is not equal to the data-rate field.

4. A transceiver operable to exchange data over a medium, comprising:

means for sending a data-length field over the medium, the data-length field being symbolic of an amount of data in a transmission desired to be sent by the first transceiver;

means for sending a data-rate field over the medium, the data-rate field being symbolic of a transmission rate of data in a transmission desired to be sent by the transceiver;

means for receiving a response data-rate field over the medium, the response data-rate field being symbolic of a transmission rate of data in a transmission desired to be received by a second transceiver;

means for sending data to the second transceiver at a data rate symbolized in the response data-rate field; and means for sending over the medium a rate confirmation packet, the rate confirmation packet including a revised data-rate field, the revised data-rate field being symbolic of a data rate equal to the data rate symbolized by the response data-rate field.

\* \* \* \* \*